United States Patent [19]

Collin

[11] 4,176,852
[45] Dec. 4, 1979

[54] HITCH ADAPTOR

[75] Inventor: John Collin, Deene, Near Corby, England

[73] Assignee: Massey-Ferguson Services N.V., Curacao, Netherlands Antilles

[21] Appl. No.: 759,509

[22] Filed: Jan. 14, 1977

[30] Foreign Application Priority Data

Jan. 21, 1976 [GB] United Kingdom ............... 02266/76

[51] Int. Cl.² .............................................. B60D 1/04
[52] U.S. Cl. ............................ 280/415 A; 280/491 E
[58] Field of Search ........... 280/491 E, 415 A, 415 R, 280/417, 504, 506

[56] References Cited

U.S. PATENT DOCUMENTS

| 3,837,674 | 9/1974 | Rathsack | 280/415 A |
| 3,951,434 | 4/1976 | Sause | 280/415 A |

FOREIGN PATENT DOCUMENTS 49200  7/1911  Austria ....................................... 280/504

Primary Examiner—John A. Pekar
Attorney, Agent, or Firm—John C. Thompson

[57] ABSTRACT

A tractor drawbar terminates in a hook. An adaptor is provided to convert the hook into a clevis. The adaptor encompasses the hook and bears against a portion of it to inhibit movement in a vertical direction.

3 Claims, 1 Drawing Figure

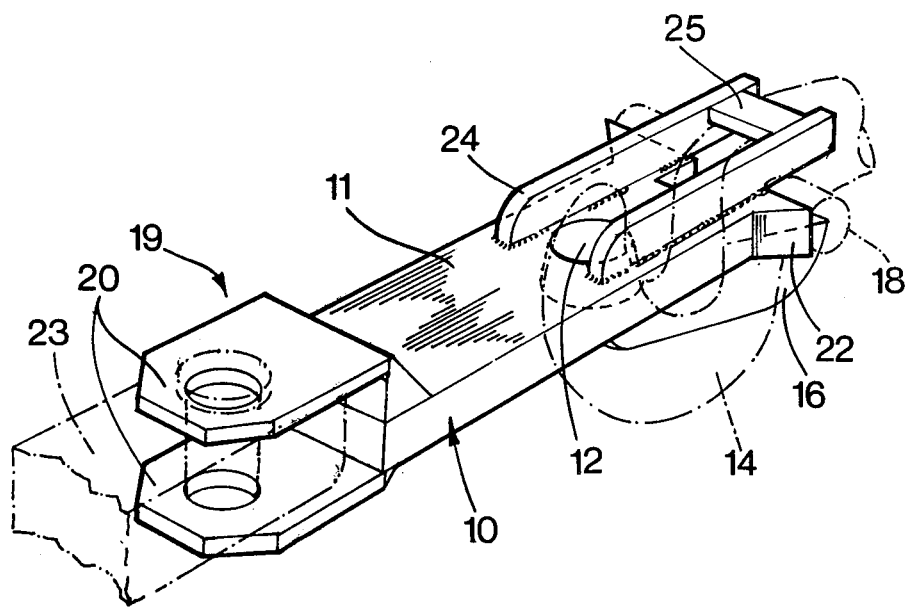

HITCH ADAPTOR

This invention relates to hitch assemblies and to an adaptor for use in hitch assemblies. In particular the invention is for an improved hitch assembly whereby towing and towed vehicles may be connected together.

In connecting tractors and a towed vehicle there has existed for some time a problem in connecting a tractor having a hook to a vehicle having a draw tongue adapted to fit in a clevis. Thus an incompatibility often exists between tractors and vehicles to be towed for which there is a need for a simple connecting element.

Several proposals have been made for solving this problem, for example in British Pat. Nos. 1,161,399 and 1,241,083, but none have provided a simple adaptor which can be readily fitted to a tractor draw bar hook to accomodate the draw tongue of the towed vehicle.

It is an object of the present invention to provide a simple adaptor which is detachably connectable to a draw bar hook to provide a rigid connection between the hook and the draw tongue. The invention also provides an assembly incorporating the adaptor. According to a first aspect of the invention a hitch assembly for connecting together towing and towed vehicles comprises an adaptor having a clevis at one end for attachment to one vehicle having a draw tongue and an opening towards the other end, the opening being arranged to receive a hook mounted on another vehicle, the draw bar having portions defining side walls of the opening which inhibit movement of the adaptor in a vertical direction when the hook is engaged in the opening, the adaptor in use lying in a generally horizontal plane between the draw tongue and the hook. Preferably the adaptor is provided with lateral abutments adjacent the opening which co-operate with the lateral extensions on the hook to inhibit movement of the adaptor relative to the hook in the horizontal plane.

According to a second aspect of the invention an adaptor for use with the assembly comprises a clevis at one end and an opening towards the other end, the adaptor having portions defining side walls of the opening which portions are arranged to inhibit a movement of the adaptor in a vertical direction when a hook is engaged in said opening.

Preferably the opening in the adaptor is tapered.

Further features of the invention will appear from the following description of an embodiment of the invention given by way of example only and with reference to the accompanying drawing which is a perspective view of an assembly of draw bar hook, adaptor and draw tongue.

Referring to the drawing an adaptor 10 is formed of a generally rectangular plate 11 having a opening 12 in the form of a circular hole which tapers upwardly and receives a draw bar hook 14 whose free end is similarly tapered. The adaptor 10 also includes downwardly and forwardly extending members 16 below the level of the plate 11 and laterally extending members 22 at each side of the end of the plate 11. Upwardly and forwardly extending members 24 extend to each side of the opening 12 and beyond the end of the plate 11 and the members 24 are interconnected towards their free ends by a cross-member 25.

At the opposite end of the adaptor 10 is an integral clevis 19 in the form of vertically spaced arms with aligned apertures 21 which receive a pin (not shown) for connecting the clevis to a draw tongue 23.

The hook 14 is fitted with cylindrical stub members 18 projecting horizontally to either side of the root of the hook and when the hook is assembled with the adaptor, the members 22 are located adjacent the members 18 with the members 16 located under the stub members 18. The members 24 are located over the root of the hook and in this way the relative positions of the hook and adaptor are maintained as shown in the drawing. The adaptor is fitted to the hook by a downward swinging movement in the vertical plane to engage the free end of the hook in the opening. The adaptor extends in a generally horizontal plane in use and affords a simple but effective means whereby a tractor hook is connected to a draw tongue on a trailer.

I claim:

1. A hitch assembly for connecting together a towing vehicle having a hook with a rearwardly disposed free end and a towed vehicle having a forwardly extending draw tongue; said assembly comprising:
cylindrical structure extending laterally outwardly from opposed sides of the root portion of the hook;
an adapter having a clevis at its rear end for attachment to the forward end of the draw tongue, engaging means toward the other end of the adapter engaging the free end of the hook, the other end of the adapter further being provided with additional means having opposed longitudinally extending side walls which cooperate with said engaging means and the root portion of said hook and the cylindrical structure to inhibit movement of the adapter when the hook is engaged, the adapter in use lying in a generally horizontal plane between the draw tongue and the hook.

2. The hitch assembly according to claim 1 wherein said engaging means is a tapered hole in the adapter prefiled to fit the free end of the hook.

3. The hitch assembly according to claim 2 wherein said additional means include outstanding members located to the sides of the tapered hole and which extend beyond the end of the adapter and cooperate with the root of the hook to maintain the adapter in position on the hook.

* * * * *